(12) United States Patent
Büchler et al.

(10) Patent No.: US 7,065,010 B2
(45) Date of Patent: Jun. 20, 2006

(54) METHOD FOR TRACKING IN AN OPTICAL RECORDING/READING APPARATUS, AND CORRESPONDING APPARATUS

(75) Inventors: Christian Büchler, Villingen-Schwenningen (DE); Marten Kabutz, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 288 days.

(21) Appl. No.: 10/362,205

(22) PCT Filed: Aug. 14, 2001

(86) PCT No.: PCT/EP01/09361

§ 371 (c)(1),
(2), (4) Date: Feb. 21, 2003

(87) PCT Pub. No.: WO02/17310

PCT Pub. Date: Feb. 28, 2002

(65) Prior Publication Data

US 2003/0174597 A1  Sep. 18, 2003

(30) Foreign Application Priority Data

Aug. 23, 2000  (DE) ................................ 100 41 426

(51) Int. Cl.
*G11B 7/095* (2006.01)
(52) U.S. Cl. .................................. 369/44.28; 369/44.41
(58) Field of Classification Search .............. 369/44.28
See application file for complete search history.

(56) References Cited

U.S. PATENT DOCUMENTS

| 5,844,871 A | * | 12/1998 | Maezawa .................. 369/44.28 |
| 5,914,922 A | | 6/1999 | Supino et al. ........... 369/44.28 |
| 5,917,784 A | | 6/1999 | Supino et al. ................. 369/32 |
| 5,956,304 A | | 9/1999 | Supino et al. ........... 369/44.34 |
| 6,014,354 A | | 1/2000 | Nomura et al. .......... 369/44.28 |
| 6,157,599 A | * | 12/2000 | Yamashita et al. ....... 369/44.28 |
| 6,317,396 B1 | * | 11/2001 | Kuribayashi ............. 369/44.35 |
| 6,775,210 B1 | * | 8/2004 | Tateishi ................... 369/44.41 |

* cited by examiner

*Primary Examiner*—Andrea Wellington
*Assistant Examiner*—Lixi Chow
(74) *Attorney, Agent, or Firm*—Joseph S. Tripoli; Harvey D. Fried; Patricia A. Verlangieri

(57) ABSTRACT

Method for tracking in an apparatus for reading from and/or writing to an optical recording medium, and corresponding apparatus for reading from and/or writing to an optical recording medium. In order, in an apparatus for reading from and/or writing to an optical recording medium (18), to enable exact counting of the tracks of the optical recording medium (18) crossed by an optical scanning unit (16), it is proposed to derive a signal corresponding to the TZC signal (Tracking ZeroCross) and also a signal corresponding to the MZC signal (Mirror Zero Cross) from the output signal or the output signals (OUT1, OUT2) of a phase comparator (1) provided for tracking in accordance with the so-called differential phase detection method.

12 Claims, 6 Drawing Sheets

METHOD FOR TRACKING IN AN OPTICAL RECORDING/READING APPARATUS, AND CORRESPONDING APPARATUS

This application claims the benefit, under 35 U.S.C. § 365 of International Application PCT/EP01/09361, filed Aug. 14, 2001, which was published in accordance with PCT Article 21(2) on Feb. 28, 2002 in English and which claims the benefit of German patent application No. 10041426.5 filed Aug. 23, 2000.

The present invention relates to a method for tracking in an apparatus for reading from and/or writing to an optical recording medium according to the preamble of claim 1, a also to a corresponding apparatus for reading from and/or writing to an optical recording medium according to the preamble of claim 17.

An apparatus of the generic type is disclosed for example in EP 0 467 498 A2 or DE 197 23 542 A1. An apparatus having a tracking device, a so-called four-quadrant detector, two summation points and a phase comparator for tracking in accordance with the so-called differential phase detection method (DPD) is proposed in the said documents. The output signals of two respective detector elements of the four-quadrant detector are respectively fed to one of the two summation points and added in this way. The two output signals of the summation points are fed to the phase comparator, which detects the phase difference between these two signals and, in a manner dependent thereon, generates a track error signal (Tracking Error Signal, TE) which is used for controlling the tracking device of the apparatus.

In conventional apparatuses for reading from and/or writing to optical recording media, relatively large jumps from one track to another track are carried out exactly by counting the number of tracks to be crossed. For exact counting of the direction of movement of the optical scanning unit, a so-called TZC signal (Tracking Zero Cross) and a so-called MZC signal (Mirror Zero Cross) are generated and evaluated. In this case, the signal TZC provides information about whether the centre of a track or the centre between two tracks is presently being crossed. The signal MZC indicates whether the scanning beam of the optical scanning unit is presently situated in the vicinity of a track centre. The signals TZC and MZC can be used for controlling the tracking device since, by way of example, switching on the track regulator is expedient only when the signal MZC indicates proximity to a track and, at the same time, the signal TZC states that the track centre is currently being crossed.

With the aid of the signals TZC and MZC, the number and direction of the tracks crossed can be counted using a track counting logic arrangement. From the phase of the two signals TZC and MZC relative to one another, it is possible to derive a statement about the number of tracks crossed and also about the direction of movement and position of the scanning beam with respect to the current track. Only as a result of the direction information produced from the phase between the two signals is incorrect counting possible in the case of eccentrically mounted discs or in the case of an actuator oscillating transversely with respect to the track direction. In this case, the phase relationship between the signals TZC and MZC should be valid over the widest possible speed range of track crossings. If the phase relationship between the signals TZC and MZC cannot be complied with, direction can no longer be identified exactly, and the accuracy of track jumps is considerably reduced in practice.

Usually, in previously known apparatuses for reading from and/or writing to optical recording media, the signals TZC and MZC are formed with the aid of analogue signal processing, i.e. by filtering and a zero comparison by means of a comparator. As is described in EP 0 539 959 A2 for example, with application of the previously mentioned differential phase detection method, the signal TZC can be obtained from the output signal of the phase comparator, i.e. from the track error signal, while the signal MZC is typically obtained from the low-pass-filtered sum of the output signals of the individual detector elements of the four-quadrant detector.

The phase between the two signals TZC and MZC is nominally +90° or −90°, the sign being determined by the direction of movement of the scanning beam relative to the tracks. Since the two signal paths for generating the signals TZC and MZC can have a different temporal behaviour, however, a reliable temporal relationship between the two signals is not automatically ensured. Specific properties of the respectively used recording medium or of the respectively used optical and electrical components of the apparatus, etc., can bring about an additional phase difference between the signals TZC and MZC. If this additional phase difference is excessively large, exact tracking is not possible. In order to solve this problem, EP 0 539 959 A2 proposes inserting various delay circuits into the TZC signal path in order to compensate the previously mentioned additional phase difference. However, this solution requires additional components and, moreover, is not sufficiently exact.

The present invention is based on the object, therefore, of proposing a method for tracking in an apparatus for reading from and/or writing to an optical recording medium, and a correspondingly configured apparatus for reading from and/or writing to an optical recording medium, the occurrence of an additional phase difference between the signals TZC and MZC being prevented to the greatest possible extent and, consequently, exact track counting and tracking being possible.

This object is achieved according to the invention by means of a method having the features of claim 1 and, respectively, an apparatus having the features of claim 17. The subclaims each define preferred and advantageous embodiments of the present invention.

According to the invention, signals which correspond to the signals TZC and MZC or are equivalent thereto are derived from an output signal of a phase comparator provided for tracking in accordance with the differential phase detection method. Since these signals have the same original signal path, no additional phase difference can occur between these two signals, thereby enabling exact counting of the tracks crossed and, consequently, exact tracking for the purpose of reading from and/or writing to any desired optical recording media, such as, for example, CD, CDI, CD-ROM, DVD, CD-R, CD-RW etc.

In order that the most exact statement possible about the proximity to a track can be derived from that signal which corresponds to the MZC signal, it is recommended that this signal be filtered or corrected, edge sequences in the input signals of the phase comparator which are not permitted to lead to a pulse in the signal corresponding to the MZC signal preferably being detected. This correction signal can be obtained from the input signals of the phase comparator and, for example, contain a statement of whether the presently scanned region of the recording medium is disturbed e.g. owing to scratches or fingerprints, in which case this correction signal can, therefore, also serve in principle for controlling the tracking device independently of the TZC and MZC signals.

The process for obtaining the previously described signals and also the corresponding signal processing can be implemented in the form of a logic circuit and be designed in an integrated manner on an integrated circuit. In this way, it is possible to reduce the required number of external/analogue components.

The invention is described in more detail below using preferred exemplary embodiments with reference to the accompanying drawing.

FIG. 1 shows a simplified block diagram of an apparatus for reading from and/or writing to an optical recording medium in accordance with a first exemplary embodiment of the present invention, FIG. 2 shows a circuit diagram of a circuit section for generating the TZC signal in accordance with a second exemplary embodiment of the present invention, FIG. 3 shows a signal diagram of input and output signals of the second exemplary embodiment shown in FIG. 2, FIG. 4 shows a circuit diagram of a circuit section for generating the MZC signal in accordance with a third exemplary embodiment of the present invention, FIG. 5 shows a signal diagram of input and output signals in the case of the third exemplary embodiment shown in FIG. 4, FIG. 6 shows a circuit diagram of a circuit section for generating a correction signal—illustrated in FIG. 1—in accordance with a fourth exemplary embodiment of the present invention, and FIG. 7 shows a signal diagram of input and output signals in the case of the fourth exemplary embodiment shown in FIG. 6.

FIG. 1 shows an apparatus according to the invention for reading from and/or writing to an optical recording medium in accordance with a first exemplary embodiment of the present invention.

A light source 13 generates a light beam which is focused onto an optical recording medium 18 by means of a semi-transparent mirror 15, which is illustrated as part of a polarizing beam splitter, and an objective lens 16. A collimator lens 14 is arranged between the light source 13 and the mirror 15. The light beam impinging on the optical recording medium 18 is reflected and directed onto a four-quadrant detector 20 via a convex lens 19. The four-quadrant detector 20 is shown tilted through 90° in FIG. 1, i.e. in plan view, and comprises four photodetector elements A, B, C and D. The four-quadrant detector 20 can be divided into two detector regions which are situated laterally with respect to the track direction of the optical recording medium 18 and comprise the detector elements A and B, on the one hand, and also C and D, on the other hand.

The objective lens 16 is moved by a drive unit 17, in accordance with specific actuating or control signals, in the radial direction with respect to the optical recording medium 18. The objective lens 16 and also the drive unit 17 are part of a tracking device of the apparatus illustrated. The optical recording medium 18 is designed as a disc and is made to rotate by means of a disc drive (not shown in FIG. 1).

The outputs of the detector elements A and C are connected to a first summation point 21, while the outputs of the detector elements B and D are connected to a second summation point 22. The corresponding summation signals A+C and D+D, respectively, are fed as input signals IN1 and IN2, respectively, to a phase comparator or phase detector 1, at whose output it is possible to tap off a track error signal TE which is determined according to the so-called differential phase detection method (DPD method) and is obtained in the following manner with the aid of controllable switches 2, 3 shown in FIG. 1 and also a low-pass filter R1, C1 coupled thereto on the output side.

The temporal spacings of the two input signals are a measure of the track deviation. If the scanning beam precisely detects the track centre of a track, the input signals IN1 and IN2 of the phase comparator 1 ideally have the same form or sequence. This means that the signals IN1 and IN2 have rising or falling edges at the same time. In this case, the two outputs of the phase comparator remain at low level "L" and no switch 2, 3 is closed. If the scanning beam has a constant yet small displacement with respect to the track centre, then the sequence of the signals IN1 and IN2 is still the same but the edges no longer ensue at the same time. By way of example, if the positive or negative edge of IN1 is before IN2, then the output OUT1 will actuate the switch 2 for the time interval between the edges, and, with the opposite sequence, the switch 3 is actuated by output OUT2. Since the sequence of the edges on IN1 and IN2 is fast relative to the time constant of the low-pass filter formed by R1, C1, a voltage proportional to the track deviation is established across C1, the polarity of the voltage specifying the direction of the track deviation.

As just described, the pulse lengths of the signals OUT1 and OUT2 likewise specify the deviation of the scanning beam from the track centre. Considered by themselves, the pulse lengths of the signals OUT1 and OUT2 specify only the magnitude of the track deviation. The direction of the track deviation results from which of the two signals OUT1 or OUT2 outputs a pulse proportional to the track deviation. In response to an associated pair of edges on IN1 and IN2, only ever one output of the phase detector 1 will yield a pulse.

Ideally, the reaching of the track centre is characterized in that the two output signals OUT1, OUT2 of the phase detector 1 do not yield any pulses. In practice, this state practically never occurs. If the scanning beam approaches the track centre, then the order of the associated edges on IN1 and IN2 will have a tendency to be reversed upon reaching the track centre. In individual cases, however, the sequence of the signals IN1 and IN2 will not follow the tendency explained above. Therefore, in practice, it is not sufficient to connect an RS flip-flop to the two outputs of the phase detector 1 in order to obtain a TZC signal. On account of the indeterminacy occurring upon reaching the track centre, upon change over of the polarity, the output of the RS flip-flop would continually toggle in the vicinity of the track centre. Therefore, an unambiguous TZC signal is possible only by "filtering", e.g. with the aid of a counter.

A counter 4 shown in FIG. 1 counts pulses at the output OUT1 in incrementing fashion and pulses at the output OUT2 in decrementing fashion. The counter 4 is configured in such a way that its counter reading cannot exceed or fall below a predetermined value. If, on average, more edges occur on output OUT2 than on output OUT1, then the counter will have a tendency to decrement its counter reading. If the counter reading reaches a predetermined value lying between its predetermined counting limits, then this can be ascertained by means of a digital comparator 5. If this predetermined value is undershot, the comparator 5 changes the level of the signal TZC.

The method described above is only an exemplary embodiment. It goes without saying that there are also other conceivable methods which allow statistical determination of the number of edges at the output OUT1 or output OUT2

(e.g. per unit time or in relation to a predetermined total number of edges) in order to enable reliable functioning of the generation of the TZC signal in practice.

As described in the introduction, the pulse lengths of the signals OUT1 and OUT2 specify only the magnitude of the track deviation. Furthermore, an associated pair of edges on IN1 and IN2 will only ever activate one output of the phase detector 1 and yield a pulse. By means of a logic OR function 6, in accordance with the exemplary embodiment a signal corresponding to the MZC signal is obtained in combination with a pulse length detector 7.

The pulse length detector 7 has the task of comparing the pulse length of a pulse which is proportional to the track deviation with a predetermined pulse length LC and of thus ascertaining whether the current track deviation lies within predetermined limits in the vicinity of the track. If the scanning beam moves slowly towards a track, then, by way of example, the pulse lengths on the output OUT1 of the phase detector 1 will become shorter and shorter until they fall below the predetermined pulse length of the pulse length detector 7. The output of the pulse length detector 7 will indicate this by means of a changeover of its output signal. In this case, the other output OUT2 of the phase detector 1 does not exhibit any pulses.

If the scanning beam slowly moves further, that is to say beyond the track centre, then the pulse lengths on the other output OUT2 of the phase detector 1 will become longer and longer until they exceed the predetermined pulse length of the pulse length detector 7, whereupon the latter switches back its output. The output of the pulse length detector 7 thus generates a window which indicates that the current track deviation lies within predetermined limits to the right or the left of the track.

Since there are many tracks lying next to one another on a medium, the track error signal TE obtained in accordance with the DPD method is a periodic signal. By way of example, if the scanning beam moves towards the region between two tracks (i.e. away from a track centre), then the pulse length of one of the output signals of the phase detector 1 and hence the value of the track error signal increase. This occurs for as long as the scanning beam can still detect the track from which it is moving away. If the scanning beam is situated precisely between two tracks, the sequence of the edges on IN1 and IN2 is uncertain, since the scanning beam detects a mixture of signals from two tracks. The sequence of the edges appears rather random here and the resultant track error signal goes back to small values.

If the scanning beam moves further towards the next track, then the sequence of the data originating from the next track is defined again, and the value of the track error signal shows the track deviation now valid.

As already explained, during scanning between the tracks, the sequence of the edges on IN1 and IN2 is uncertain, since the scanning beam detects a mixture of signals from two tracks. Therefore, short pulse lengths are also generated again and again in this region, which pulse lengths likewise lie below the value predetermined for the pulse length detector 7. In order nevertheless to generate a signal which identifies only the proximity to the track, "filtering", for example by means of a counter or by masking with the aid of an auxiliary signal, is therefore necessary, which is described in more detail below.

As already mentioned, the sequence of the input signals differs from track centre to the region between two tracks in that the sequence of the edges of the signals IN1 and IN2 is identical on the track and exhibits only a displacement proportional to the track deviation. Between the tracks, however, the sequence of the signals IN1 and IN2 is rather random, since the scanning beam detects a mixture of signals from two tracks. Paired edges of IN1 and IN2 do not occur here.

The exemplary embodiment of FIG. 1 shows that this can be ascertained with the aid of a sequence detector 8. The sequence detector 8 identifies whether a high-low sequence of an input signal (e.g. of the signal IN1) is likewise contained in the respective other signal (e.g. in2). In this case, the order of at most one edge (e.g. on IN1) is permitted to change with respect to the other edge (e.g. on IN2). If at least two edges successively change their order with respect to the respective other signal considered, this is a violation of the allowed order and an indicator that the system is between the tracks. Since these forbidden orders do not occur continuously even between the tracks, "filtering" with the aid of a counter or other techniques is necessary in this case, too, in order to be able to take a more reliable decision. One possibility, in principle, consists in statistically evaluating the forbidden edge orders v present in a sequence of n edges and outputting a signal in the event of a predetermined value u=n−v being undershot, which signal is intended to identify the region between the tracks. This can be done for example by means of a chain of shift registers $9_1$-$9_n$ and a counter 10.

For each high-low sequence, the sequence detector 8 outputs a counting pulse on one of its outputs. Its second output signal specifies whether this last sequence was valid or invalid. This information concerning the valid or invalid sequences is delayed by the chain of shift registers $9_1$-$9_n$ having a predetermined length n. The counter 10 counts in an incrementing fashion all sequences identified as valid before the shift register chain, while the invalid sequences do not influence the counter reading. The sequences identified as valid after the shift register chain decrement the counter 10, and sequences marked as invalid do not alter the counter reading. In the case of a considered sequence of 16 sequences, for example, a maximum of 16 of 16 sequences may be valid. If the number of valid sequences n-v within the total number n of sequences considered falls below a predetermined value u, then this is detected with the aid of a digital comparator 11. The output signal QUALITY of the comparator 11 thus indicates whether the number of forbidden sequences within the considered number of sequences falls below a predetermined value, which indicates scanning between two tracks. Furthermore, the signal can also show whether the order of the edges of IN1 and IN2 is disturbed owing to a scratch, etc., on the medium 18 to be played back.

Likewise, the signal QUALITY can be used for masking the MZC detector 6, 7 since, under certain circumstances, the said detector also reacts to short pulse lengths which can occur in the region between the tracks.

It goes without saying that there are also other conceivable methods which allow statistical evaluation of the number of invalid edges (e.g. per unit time or in relation to a predetermined total number of edges).

The signals TE, TZC, MZC and QUALITY generated in accordance with FIG. 1 can all be used as a basis for the tracking or as control signals for the drive unit 17.

FIG. 2 shows a further, schematic exemplary embodiment of a TZC detector for generating the TZC signal with OR gates 30, AND gates 31, NAND gates 32, NOT gates 33, XOR gates 34, NOR gates 35, drivers 36 and D flip-flops 37.

The output of the phase detector 1, which is likewise shown in FIG. 2, firstly feeds an RS flip-flop constructed from two NOR gates. The output QOUTQ of the said flip-flop indicates the sign of the order of the respective current pair of signal edges at the input of the phase detector. If the signal QOUTQ is at "H", then the edge on IN1 was before that on IN2. If QOUTQ is at "L", then the order of the signals IN1 and IN2 was reversed. This direction information controls the counting direction of a 3-bit up/down counter 4. This counter counts up or down for each edge occurring on IN2 or IN1, depending on the counting direction. In the example shown, at least eight successive edges of the same order are necessary in order to cause the counter to count from 0 to 7or vice versa. As already mentioned, the orders of the edges in the vicinity of the track centre are not uniform. The output of the RS flip-flop mentioned can thus change. However, if there are, on average, eight edges of a specific order more than those of the other order, then the counter 4 will reach either the counter reading 0 or 7. If the counter 4 reaches its lower limit, then it sets a further RS flip-flop 5; the RS flip-flop 5 is reset when the upper limit is reached. The counter 4 and the second RS flip-flop 5 thus interact like a hysteresis in the switching behaviour of the TZC signal and make it possible to reliably indicate that the track centre has been exceeded. In this case, the RS flip-flop 5 and the gates connected upstream correspond to the digital comparator shown in FIG. 1.

FIG. 3 is a signal diagram which shows by way of example the input and output signals IN1, IN2, ENA, SGN, QOUTQ, TZC, Q0 . . . Q2 of the circuit illustrated in FIG. 2.

The phase comparator shown in FIG. 1 and FIG. 2 merely constitutes an exemplary embodiment. The output signals of the phase comparator can, for example, either indicate the magnitude of the time difference (cf. signal ENA in FIG. 3) and sign/polarity (cf. signal SGN in FIG. 3) or else the pulses having a length corresponding to the time difference, in each case only one of the two outputs being active, depending on the order of the input signals (cf. the signals OUT1 and OUT2 described below and shown in FIG. 5). In particular, the phase comparator 1 can be configured in the form of a digital phase comparator which forwards the time differences between its two input signals to the further stages not as a variable pulse length but as a digital signed value.

FIG. 4 comprises an exemplary embodiment of an MZC detector which is improved in comparison with FIG. 1. The phase detector 1 is designated here as block. In contrast to the solution—described in FIG. 1—of a common pulse length detector for the signals OUT1 and OUT2, two pulse length detectors 7 (realized by means of monostable multivibrator) are used in FIG. 4. The respective outputs of the monostable multivibrators 7 show whether the currently measured pulse length of OUT1 and OUT2 exceed or fall below a pulse length predetermined by the monostable multivibrator. The signal 1_LONG_M shows, for example, if the edges of the signal IN1 occur before those of the signal IN2 but lie within the time period (=pulse length at OUT1 ) predetermined by the first monostable multivibrator. This applies correspondingly to 2_LONG_M given the opposite order of the edges at IN1 and IN2.

In a similar manner to the TZC detector shown in FIG. 2, a hysteresis is generated by means of a counter 23 and an RS flip-flop 24 in this case, too, in order to avoid a continual changeover of the signal MZC in the vicinity of the predetermined pulse lengths. For its part, the signal MZC is formed from logic AND combination of the signals SHORT1 and SHORT2, i.e. the output signals of the two RS flip-flops 24.

Figure 1:
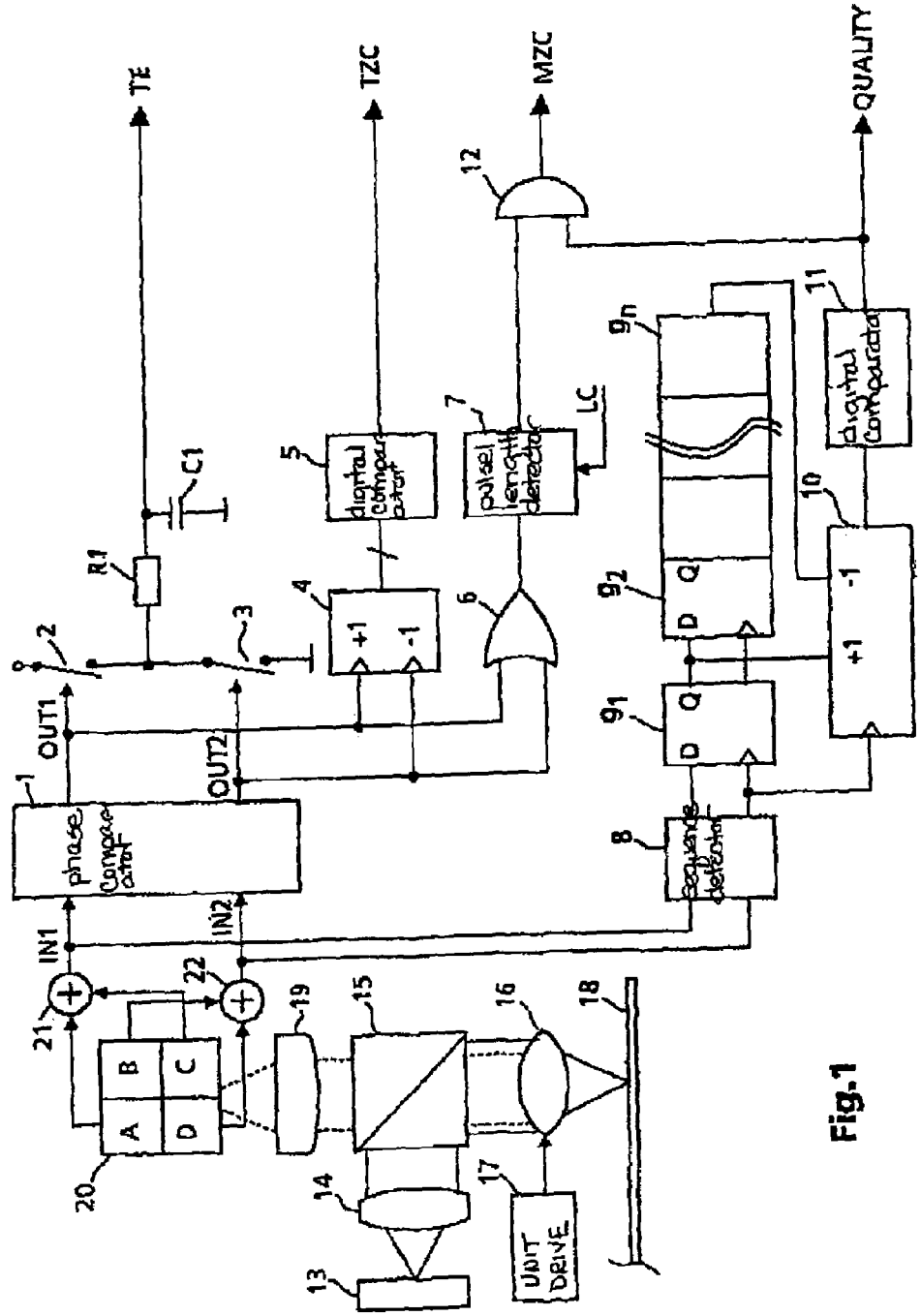

The most important block is the sequence detector 8. Its task is to identify absent cycles or incorrect sequences of the signals IN1 and IN2 relative to one another, as has already been explained above (see FIG. 1). For each high-low sequence of the two input signals, the sequence detector 8 outputs a counting pulse on output T1. Its second output signal X0 specifies whether this last sequence was valid or invalid. This information concerning the valid or invalid sequences is delayed by a chain of, for example, four shift registers. For each falling edge of T1, a counter 10 (2-bit counter) counts in an incrementing fashion all sequences identified as valid before the shift register chain, while the invalid sequences do not influence the counter reading. The sequences identified as valid after the shift register chain decrement the counter 10 in the case of falling edges of T1, and sequences marked as invalid do not alter the counter reading. The control signals CNTENA and CNTUP enable this behaviour.

The counter reading reproduces how many of the considered sequences of the signals IN1 and IN2 were correct. In the example shown in FIG. 6, the counter 10 can assume the values 0 . . . 3 since a maximum of four valid sequences can be stored in the shift registers X1 to X4.

Figure 6:
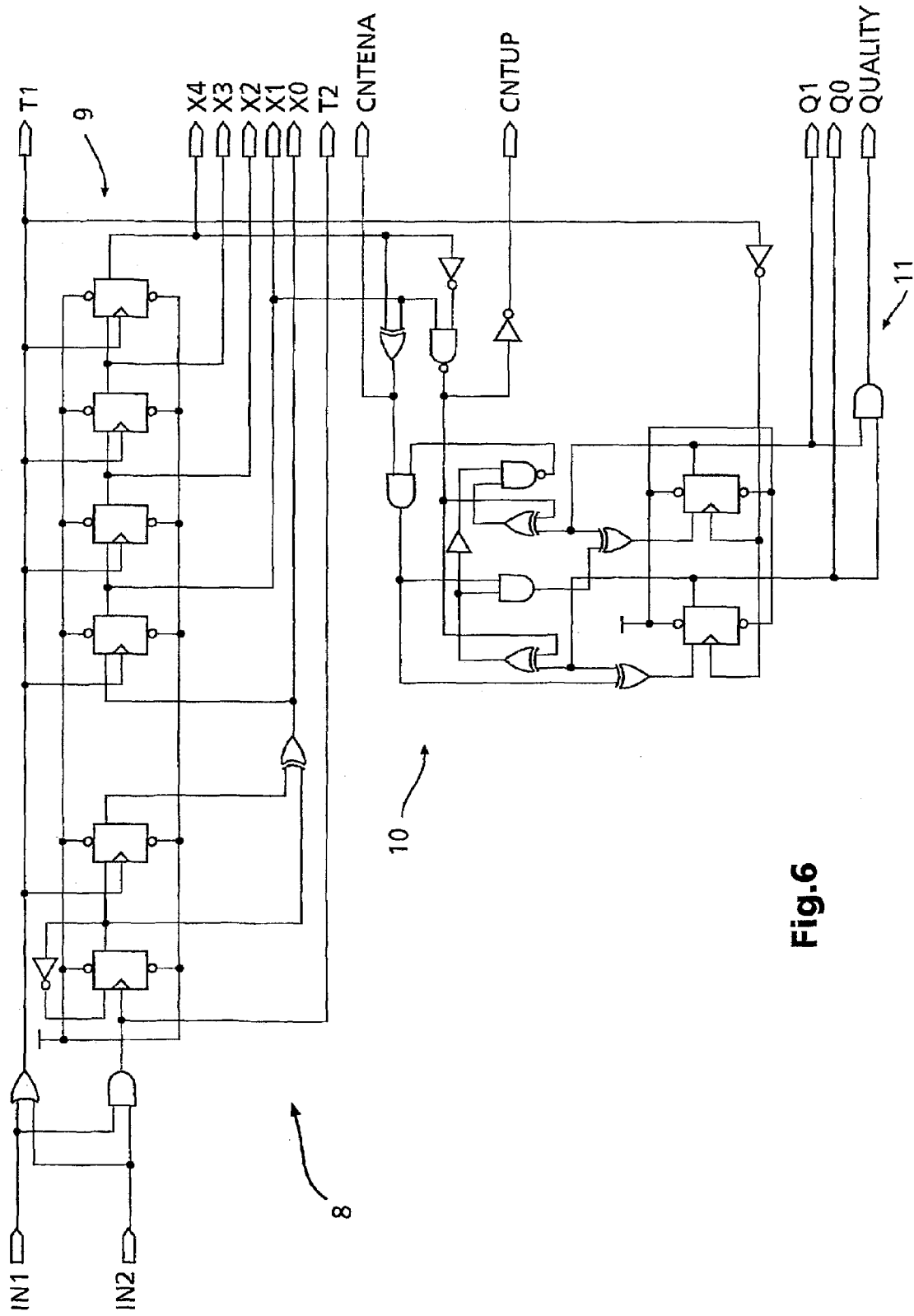
FIG. 6 shows a schematic exemplary embodiment of a signal quality detector which is used for generating the signal QUALITY already explained with reference to FIG. 1.

A 2-bit comparator 11 decodes whether the current number of valid sequences falls below a predetermined value. In the example of FIG. 6, all sequences must be correct in order to set the signal QUALITY to the level "H".

Figure 7:
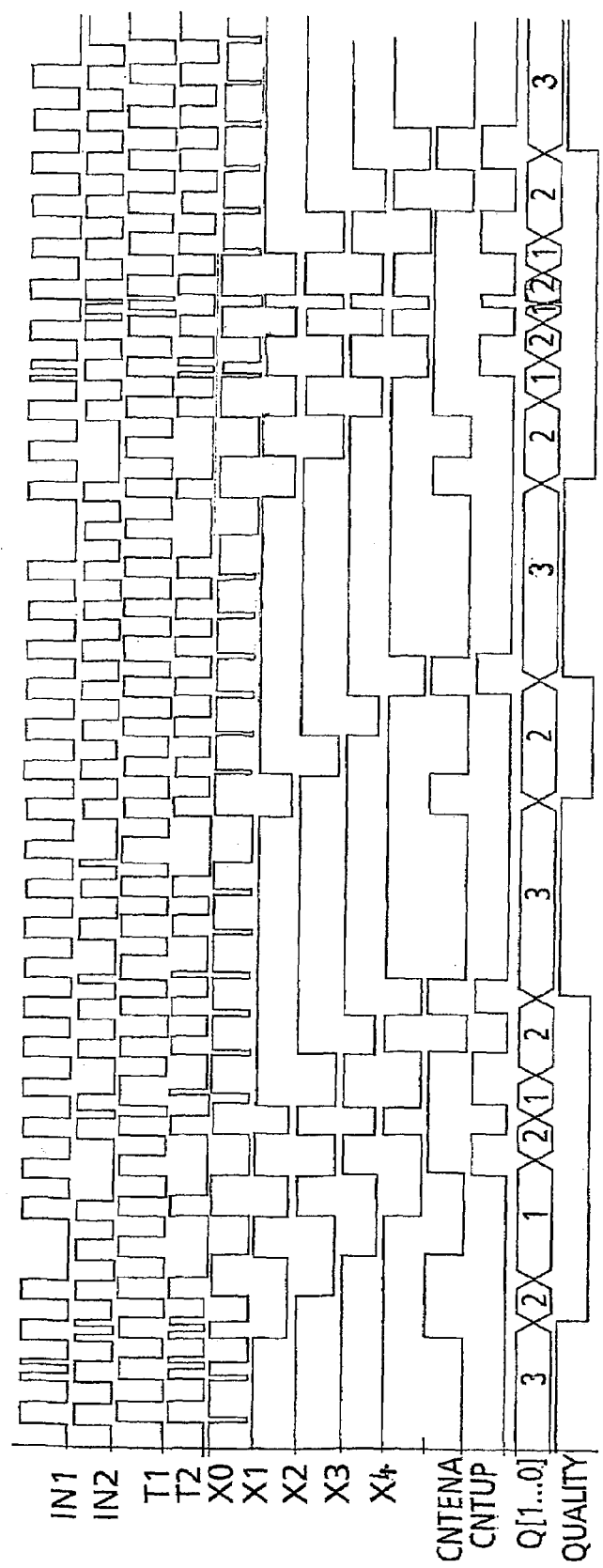

FIG. 7 once again illustrates an exemplary signal diagram for the signals shown in FIG. 6.

In other words, according to the invention, in order, in an apparatus for reading from and/or writing to an optical recording medium 18, to enable exact counting of the tracks of the optical recording medium 18 crossed by an optical scanning unit 16, it is proposed to derive a signal corresponding to the TZC signal (Tracking Zero Cross) and also a signal corresponding to the MZC signal (Mirror Zero Cross) from the output signal or the output signals (OUT1, OUT2 ) of a phase comparator 1 provided for tracking in accordance with the so-called differential phase detection method.

Figure 2:
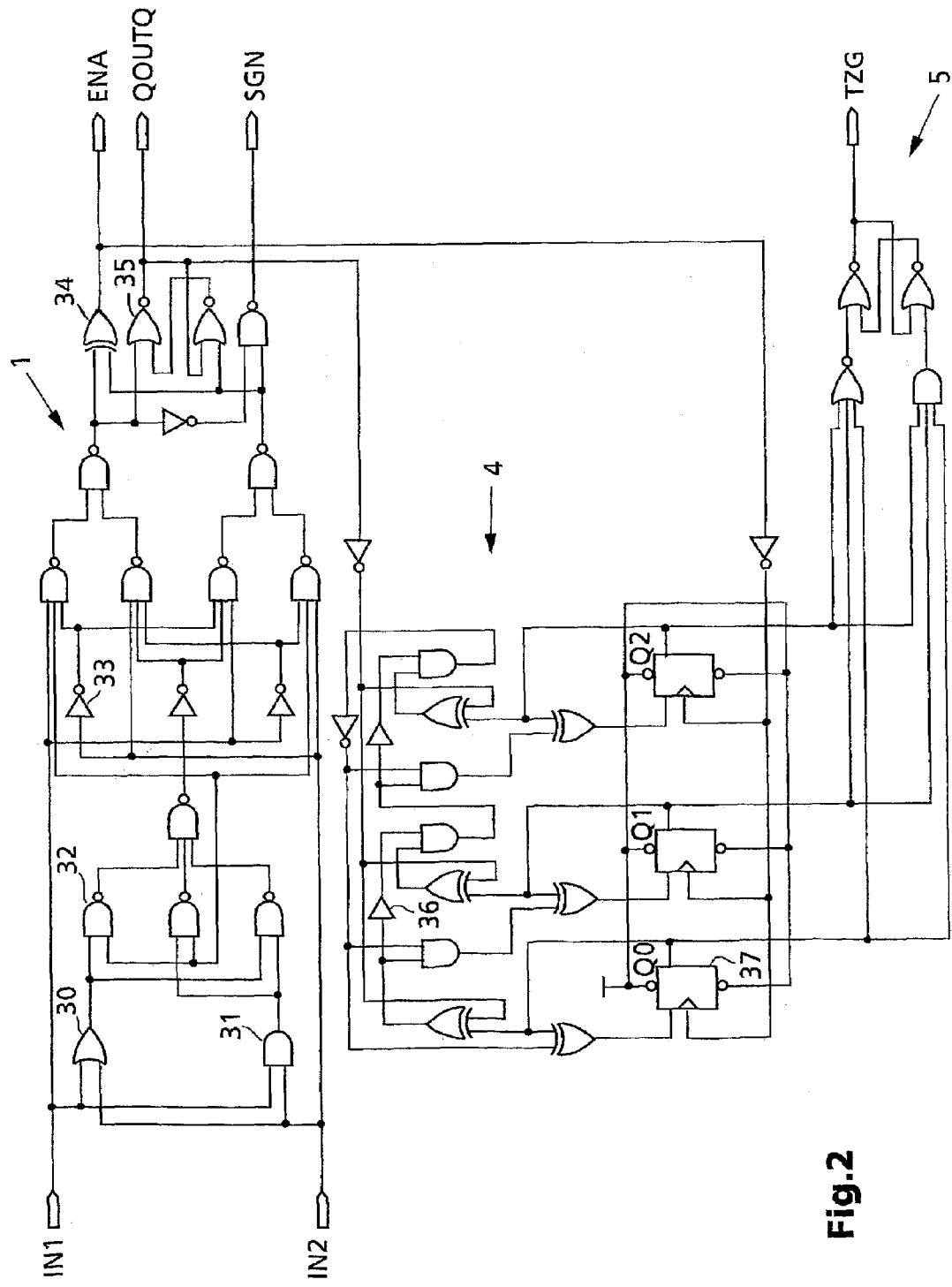
Figure 3:
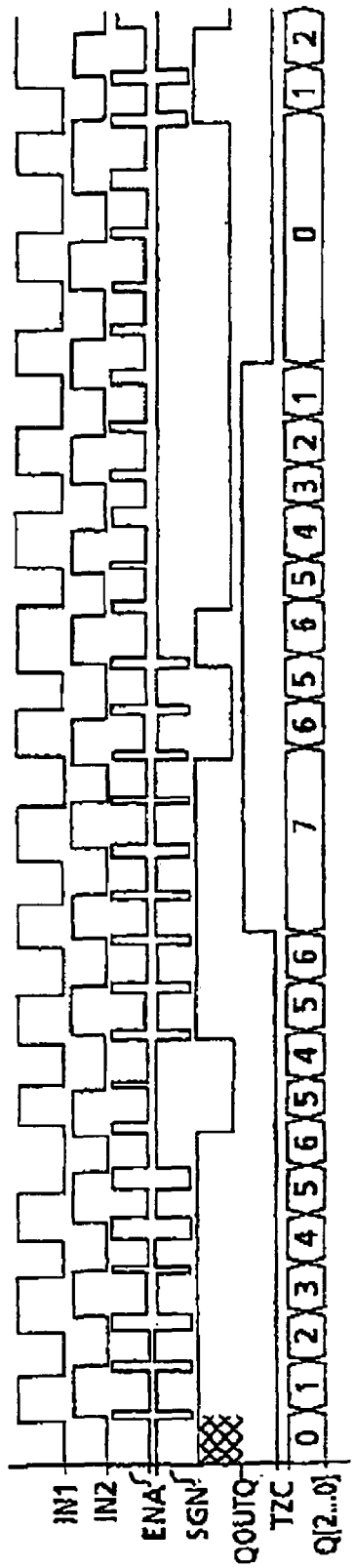
Figure 4:
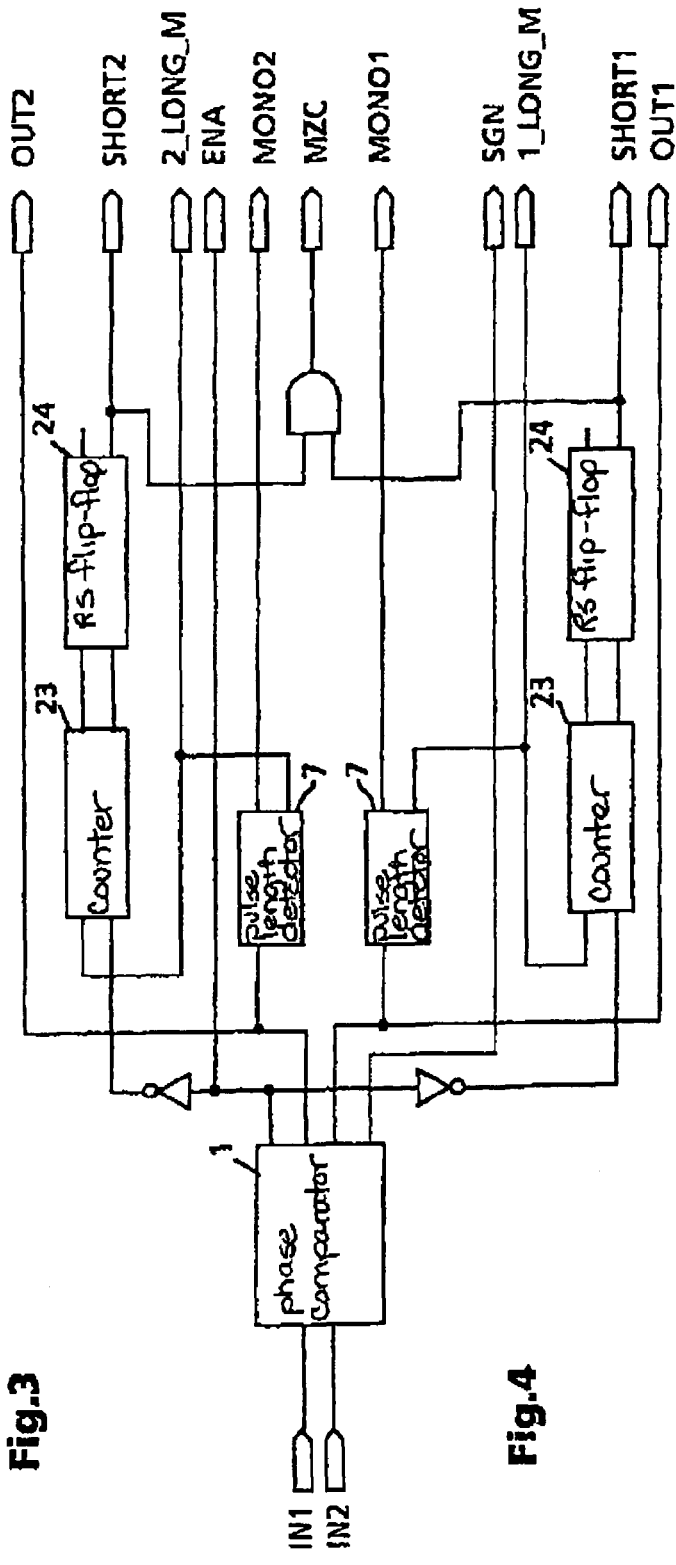
Figure 5:
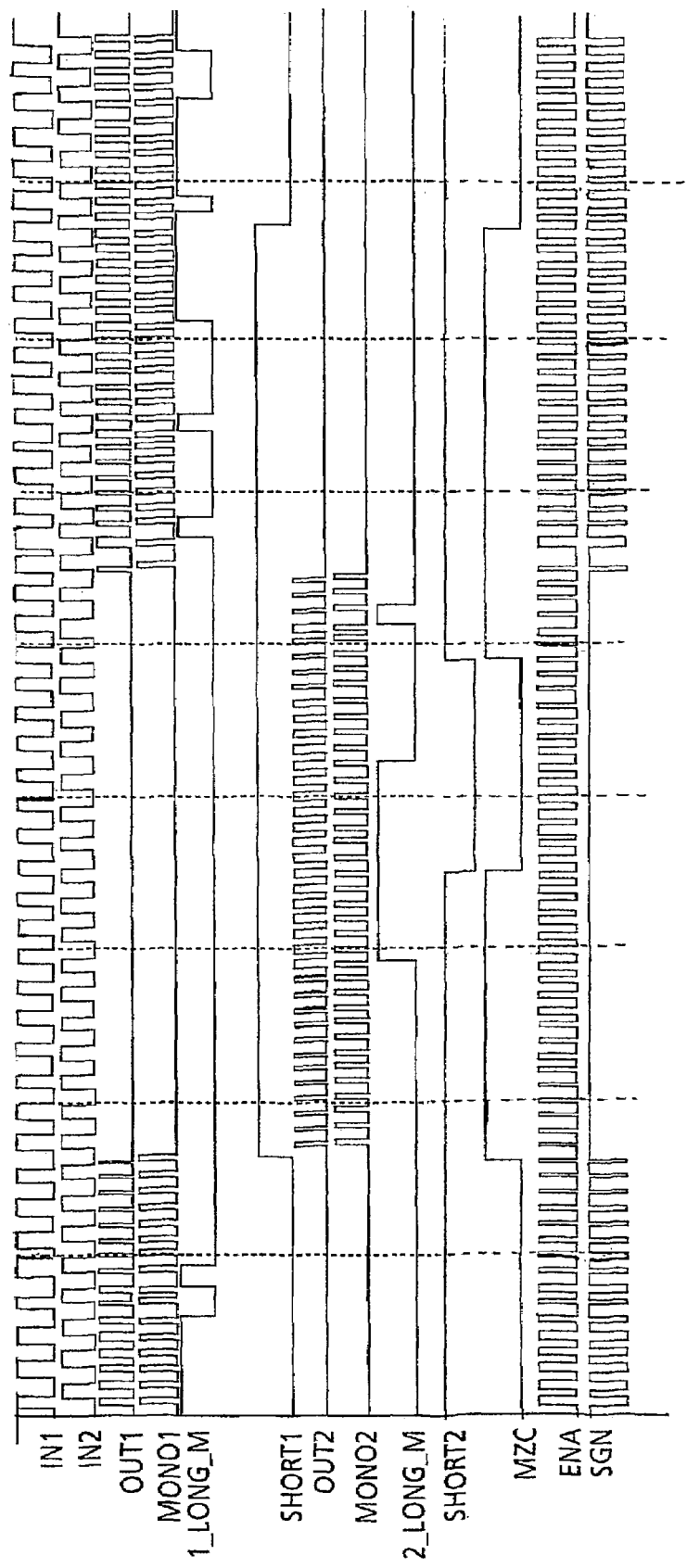
FIG. 5 is a signal diagram which shows by way of example the input and output signals of the circuit described in FIG. 4.

Finally, it is pointed out that FIG. 2, FIG. 4 and FIG. 6 show simplified exemplary embodiments which, for the sake of simplicity, contain counters and shift registers having a small bit width. In practice, however, it is expedient to use a larger number of bits in order to generate unambiguous TZC, MZC and QUALITY signals. The required complexity depends on the type of optical scanner and the signal quality thereof with respect to the input signals of the phase comparator 1.

The invention claimed is:

1. Method for tracking in an apparatus for reading from and/or writing to an optical recording medium, the apparatus having a tracking device, a photodetector having at least two light-sensitive areas and a phase comparator, the method comprising the steps of:

using the phase comparator to compare phases of first and second input signals related to a first and a second of said at least two light-sensitive areas respectively, and to produce first and second output signals, said output signals indicating amount of phase difference and sign of phase difference of said first and second input signals, and using the tracking device to control a scanning beam in a manner dependent on a tracking signal formed from both first and second output signals, and to generate a first control signal, which indicates that the scanning beam has crossed a track centre of the recording medium, and a second control signal, which states whether that region of the recording medium which is currently detected by the scanning beam is a track or region between two tracks; and which first and second control signals are used for controlling the tracking device during a track jump operation.

wherein the first control signal is formed by statistically evaluating individual time difference values, which indicate the time difference between input signals of the phase comparator and associated polarities of the output signals of the phase comparator.

2. Method for tracking in an apparatus for reading from and/or writing to an optical recording medium, the apparatus having a tracking device, a photodetector having at least two light-sensitive areas and a phase comparator, the method comprising the steps of:

using the phase comparator to compare phases of first and second input signals related to a first and a second of said at least two light-sensitive areas, respectively, and to produce first and second output signals, said output signals indicating amount of phase difference and sign of phase difference of said first and second input signals, and using the tracking device to control a scanning beam in a manner dependent on a tracking signal formed from both first and second output signals, and to generate a first control signal, which indicates that the scanning beam has crossed a track centre of the recording medium, and a second control signal which states whether that region of the recording medium which is currently detected by the scanning beam is a track or a region between two tracks; and which first and second control signals are used for controlling the tracking device during a track jump operation;

wherein the second control signal is formed by statistically evaluating the magnitudes of individual time difference values which indicate the time differences between input signals of the phase comparator of the output signals of the phase comparator.

3. Method for tracking in an apparatus for reading from and/or writing to an optical recording medium, the apparatus having a tracking device, a photodetector having at least two light-sensitive areas and a chase comparator, the method comprising the steps of:

using the phase comparator to compare phases of first and second input signals related to a first and a second of said at least two light-sensitive areas, respectively, and to produce first and second output signals, said output signals indicating amount of phase difference and sign of phase difference of said first and second input signals, and using the tracking device to control a scanning beam in a manner dependent on a tracking signal formed from both first and second output signals, and to generate a first control signal, which indicates that the scanning beam has crossed a track centre of the recording medium, and a second control signal, which states whether that region of the recording medium which is currently detected by the scanning beam is a track or a region between two tracks; and which first and second control signals are used for controlling the tracking device during a track jump operation, wherein the second control signal is corrected in accordance with a third control signal, the third control signal containing a statement about an edge sequence which is contained in the output signals of the phase comparator and is not intended to be taken into account in the generation of the second control signal.

4. Method according to claim 3, wherein the third control signal is derived from input signals of the phase comparator.

5. Method according to claim 3, wherein the third control signal indicates whether that region of the recording medium which is currently detected by the scanning beam is a region between two tracks.

6. Method for tracking in an apparatus for reading from and/or writing to an optical recording medium, the apparatus having a tracking device, a photodetector having at least two light-sensitive areas and a phase comparator, the method comprising the steps of:

using the phase comparator to compare phases of first and second input signals related to a first and a second of said at least two light-sensitive areas, respectively, and to produce first and second output signals, said output signals indicating amount of phase difference and sign of phase difference of said first and second input signals, and using the tracking device to control a scanning beam in a manner dependent on a tracking signal formed from both first and second output signals, and to generate a first control signal, which indicates that the scanning beam has crossed a track centre of the recording medium, and a second control signal, which states whether that region of the recording medium which is currently detected by the scanning beam is a track or a region between two tracks; and which first and second control signals are used for controlling the tracking device during a track jump operation, wherein said first output signal indicates the amount of phase difference between said first input signal and said second input signal, and said second output signal indicates which of said first and second input signal leads in phase.

7. Apparatus according to claim 6 for reading from and/or writing to an optical recording medium, the apparatus comprising;

a tracking device, a photodetector having at least two light-sensitive areas and a phase comparator for tracking a scanning beam of the apparatus in accordance with the differential phase detection method, said phase comparator having first and second input signals related to a first and a second of said at least two light-sensitive areas, respectively, and providing first and second output signals indicating amount of phase difference and sign of phase difference of said first and second input signals, and means for generating a tracking signal from both of said first and second output signals, wherein provision is made of a first signal generation device for generating a first control signal, which indicates that the scanning beam has crossed a track centre of the recording medium, in a manner dependant on both first and second output signals of the phase comparator, and wherein provision is made of a second signal generation device for generating a second control, which states whether that region of the recording medium which is currently detected by the scanning beam is a track or a region between two tracks, in a manner dependent on the same first and second output signals of the phase comparator, wherein the tracking device is to be controlled during a track jump operation in a manner dependent on the first control signal and the second control signal, and wherein the first signal generation device is configured in such a way that the first control signal is generated in a manner dependant on an evaluation of a time difference value, which indicates the time difference between input signals of the phase comparator, and an associated polarity of the output signals of the phase comparator.

8. Apparatus according to claim 7, wherein the first signal generation device is configured in such a way that the first control signal is generated in a manner dependent on a statistical evaluation of the time difference values, which indicate the time differences between input signals of the phase comparator, and the associated polarities of the output signals of the phase comparator.

9. Apparatus for reading from and/or writing to an optical recording medium, the apparatus comprising:

a tracking device, a photodetector having at least two light-sensitive areas and a phase comparator for tracking a scanning beam of the apparatus in accordance with the differential phase detection method, said phase comparator having first and second input signals related to a first and a second of said at least two light-sensitive areas, respectively, and providing first and second output signals indicating amount of phase difference and sign of phase difference of said first and second input signals, and means for generating a tracking signal from both of said first and second output signals, wherein provision is made of a first signal generation device for generating a first control signal, which indicates that the scanning beam has crossed a track centre of the recording medium, in a manner dependent on both first and second output signals of the phase comparator, and wherein provision is made of a second signal generation device for generating a second control signal, which states whether that region of the recording medium which is currently detected by the scanning beam is a track or a region between two tracks, in a manner dependent on the same first and second output signals of the phase comparator, wherein the tracking device is to be controlled during a track jump operation in a manner dependent on the first control signal and the second control signal, wherein the second signal generation device is configured in such a way that the second control signal is generated by a statistical evaluation of the magnitudes, which indicate the time differences between input signals of the phase comparator, of individual time difference values of the output signals of the phase comparator.

10. Apparatus for reading from and/or writing to an optical recording medium, the apparatus comprising:

a tracking device a photodetector having at least two light-sensitive areas and a phase comparator for tracking a scanning beam of the apparatus in accordance with the differential phase detection method, said phase comparator having first and second input signals related to a first and a second of said at least two light-sensitive areas, respectively, and providing first and second output signals indicating amount of phase difference and sign of phase difference of said first and second input signals, and means for generating a tracking signal from both of said first and second output signals, wherein provision is made of a first signal generation device for generating a first control signal, which indicates that the scanning beam has crossed a track centre of the recording medium, in a manner dependent on both first and second output signals of the phase comparator, and wherein provision is made of a second signal generation device for generating a second control signal, which states whether that region of the recording medium which is currently detected by the scanning beam is a track or a region between two tracks, in a manner dependent on the same first and second output signals of the phase comparator, wherein the tracking device is to be controlled during a track jump operation in a manner dependent on the first control signal and the second control signal, wherein provision is made of a correction signal generation device for generating a third control signal, which contains a statement about edge sequences which are contained in the output signals of the phase comparator and are not intended to be taken into account in the generation of the second control signal.

11. Apparatus according to claim 10, wherein the correction signal generation device is configured in such a way that it monitors input signals fed to the phase comparator and checks whether a specific edge sequence of the input signal of the phase comparator is also contained in the other input signal of the phase comparator, and generates the correction signal in a manner dependent on whether the order of more than one edge is different in the input signals of the phase comparator.

12. Apparatus for reading from and/or writing to an optical recording medium, the apparatus comprising:

a tracking device, a photodetector having at least two light-sensitive areas and a phase comparator for tracking a scanning beam of the apparatus in accordance with the differential phase detection method, said phase comparator having first and second input signals related to a first and a second of said at least two light-sensitive areas, respectively, and providing first and second output signals indicating amount of phase difference and sign of phase difference of said first and second input signals, and means for generating a tracking signal from both of said first and second output signal, wherein provision is made of a first signal generation device for generating a first control signal, which indicates that the scanning beam has crossed a track centre of the recording medium, in a manner dependent on both first and second output signals of the phase comparator, and wherein provision is made of a second signal generation device for generating a second control signal which states whether that region of the recording medium which is currently detected by the scanning beam is a track or a region between two tracks, in a manner dependent on the same first and second output signals of the phase comparator, wherein the tracking device is to be controlled during a track ump operation in a manner dependent on the first control signal and the second control signal, wherein said first output signal indicates the amount of a phase difference between said first input signal and said second input signal, and said second output signal indicates which of said first and second input signal leads in phase.

* * * * *